US009100823B2

(12) United States Patent
Kutsuwada et al.

(10) Patent No.: US 9,100,823 B2
(45) Date of Patent: Aug. 4, 2015

(54) INFORMATION PROCESSING SYSTEM AND INFORMATION PROCESSING APPARATUS

(75) Inventors: Tetsuro Kutsuwada, Kanagawa (JP); Takeshi Fujita, Tokyo (JP); Yasuharu Yanamura, Kanagawa (JP); Akira Masuda, Tokyo (JP); Kohichi Nishide, Tokyo (JP); Yohei Fujita, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 172 days.

(21) Appl. No.: 13/611,848

(22) Filed: Sep. 12, 2012

(65) Prior Publication Data

US 2013/0070566 A1    Mar. 21, 2013

(30) Foreign Application Priority Data

Sep. 15, 2011   (JP) .................... 2011-202196

(51) Int. Cl.
*H04W 12/06*   (2009.01)
*H04W 4/08*   (2009.01)

(52) U.S. Cl.
CPC .............. *H04W 12/06* (2013.01); *H04W 4/08* (2013.01)

(58) Field of Classification Search
CPC ..... G06F 21/10; G06F 21/6218; G06F 21/31; G06F 21/43; H04L 63/08; H04L 63/0428; H04L 2209/80; H04L 63/10; H04L 63/061; H04L 63/0869; H04L 63/18; H04L 2209/805; H04L 9/3231; G08C 23/02; G08C 19/12; G08C 17/02; H03J 9/04; H04W 84/01; H04W 88/00; H04W 4/00; H04W 8/005; H04W 4/008; H04W 12/04; H04W 12/06; H04W 12/08; H04M 1/7253; H04M 2250/02; H04M 1/6066; H04M 1/6091; H04M 2250/04

USPC ............ 340/5.1, 5.2, 5.74, 5.8, 7.1; 367/197, 367/199; 726/17, 21, 26–30; 713/168, 713/182–184; 380/270, 271, 287, 53; 715/741, 742; 455/41.1, 41.2
See application file for complete search history.

(56) References Cited

U.S. PATENT DOCUMENTS

2006/0108428 A1*   5/2006   Broere .................... 235/472.02
2011/0010761 A1*   1/2011   Doyle ................................ 726/5
(Continued)

FOREIGN PATENT DOCUMENTS

| JP | 2006-031346 A | 2/2006 |
|----|---------------|--------|
| JP | 2006-244311   | 9/2006 |

(Continued)

OTHER PUBLICATIONS

Office Action for Japanese Patent Application No. 2011-202196 dated May 26, 2015.

*Primary Examiner* — Brian Zimmerman
*Assistant Examiner* — Laura Nguyen
(74) *Attorney, Agent, or Firm* — Harness, Dickey & Pierce, P.L.C.

(57) ABSTRACT

An information processing system includes a first information processing apparatus that outputs a sound of a predetermined frequency; and a second information processing apparatus that collects the sound that is output from the first information processing apparatus, and outputs a response to the sound of the predetermined frequency to the first information processing apparatus. The first information processing apparatus transmits predetermined data to the second information processing apparatus that has output the response to the sound of the predetermined frequency.

14 Claims, 14 Drawing Sheets

(56) References Cited

U.S. PATENT DOCUMENTS

| | | | |
|---|---|---|---|
| 2011/0059720 A1* | 3/2011 | Penix et al. | 455/404.2 |
| 2011/0173651 A1* | 7/2011 | Perry, II | 725/31 |
| 2012/0045994 A1* | 2/2012 | Koh et al. | 455/41.3 |
| 2012/0214416 A1* | 8/2012 | Kent et al. | 455/41.2 |

FOREIGN PATENT DOCUMENTS

| | | |
|---|---|---|
| JP | 2009-175842 | 8/2009 |
| WO | WO-2010/050700 A2 | 5/2010 |

\* cited by examiner

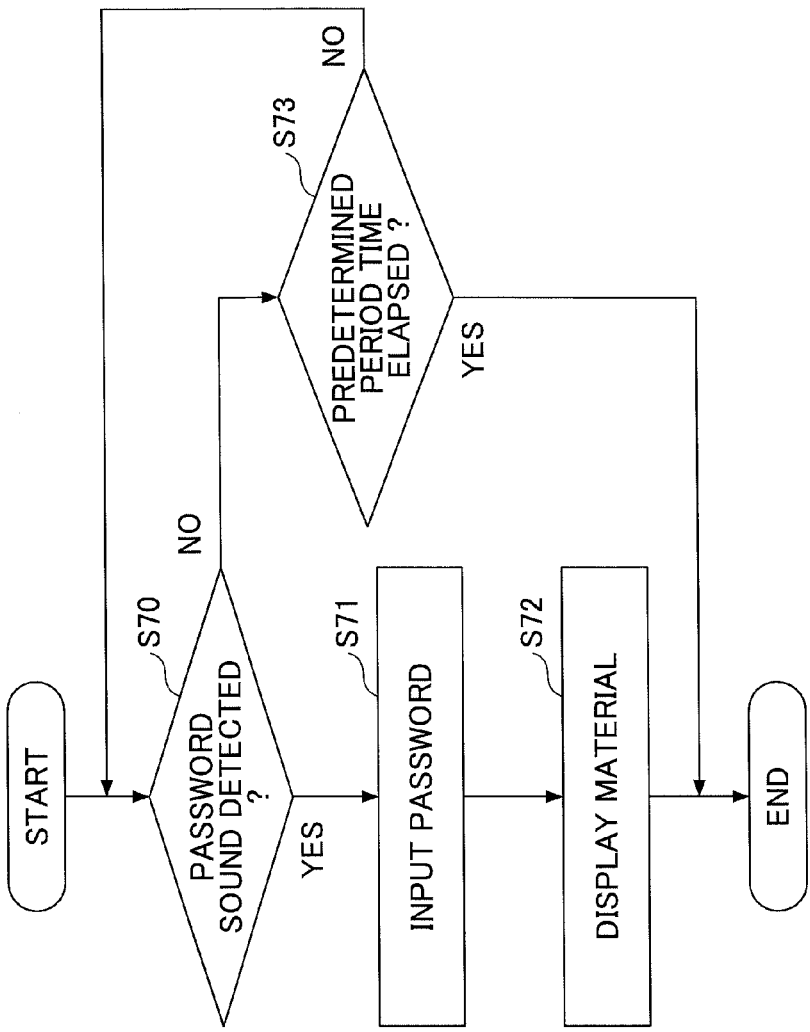
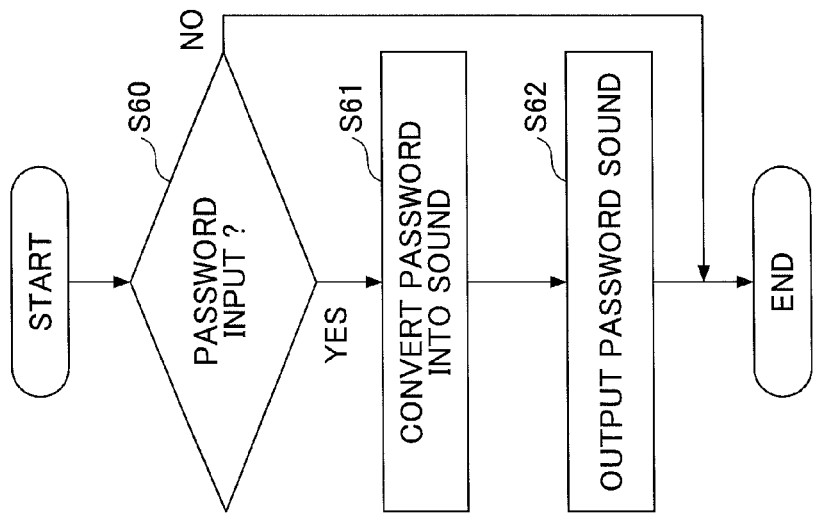

FIG.12

| MEETING NAME | XXX PRODUCT MEETING |
| MATERIAL | PRODUCT PLANNING.pdf |
| PASSWORD | 1234 |

OK

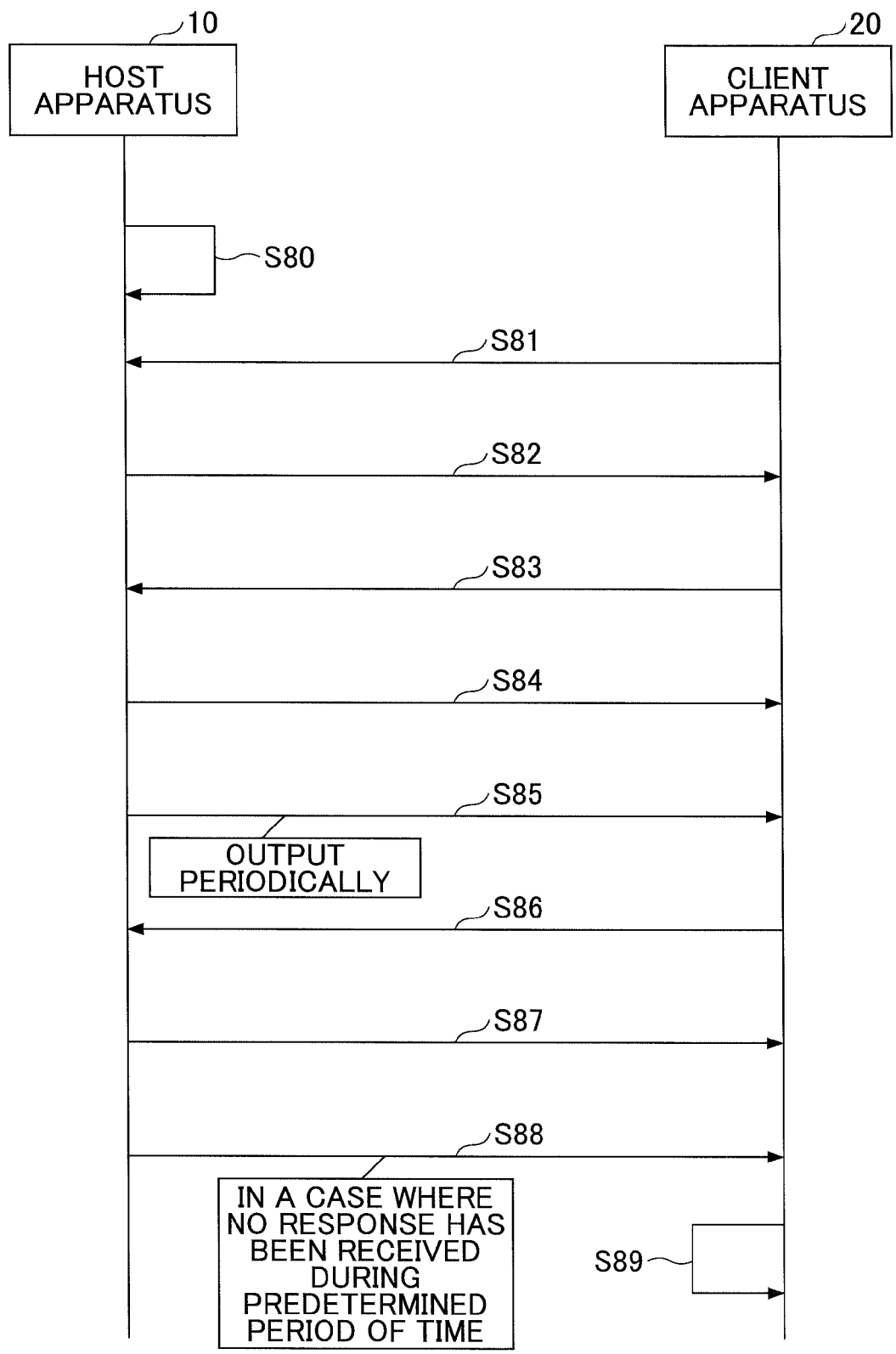

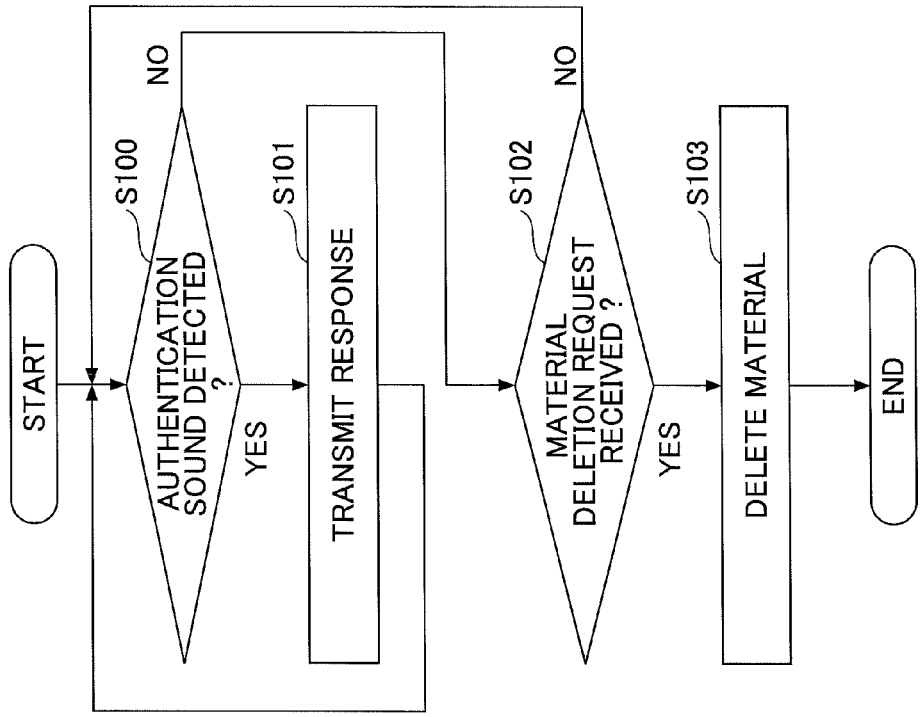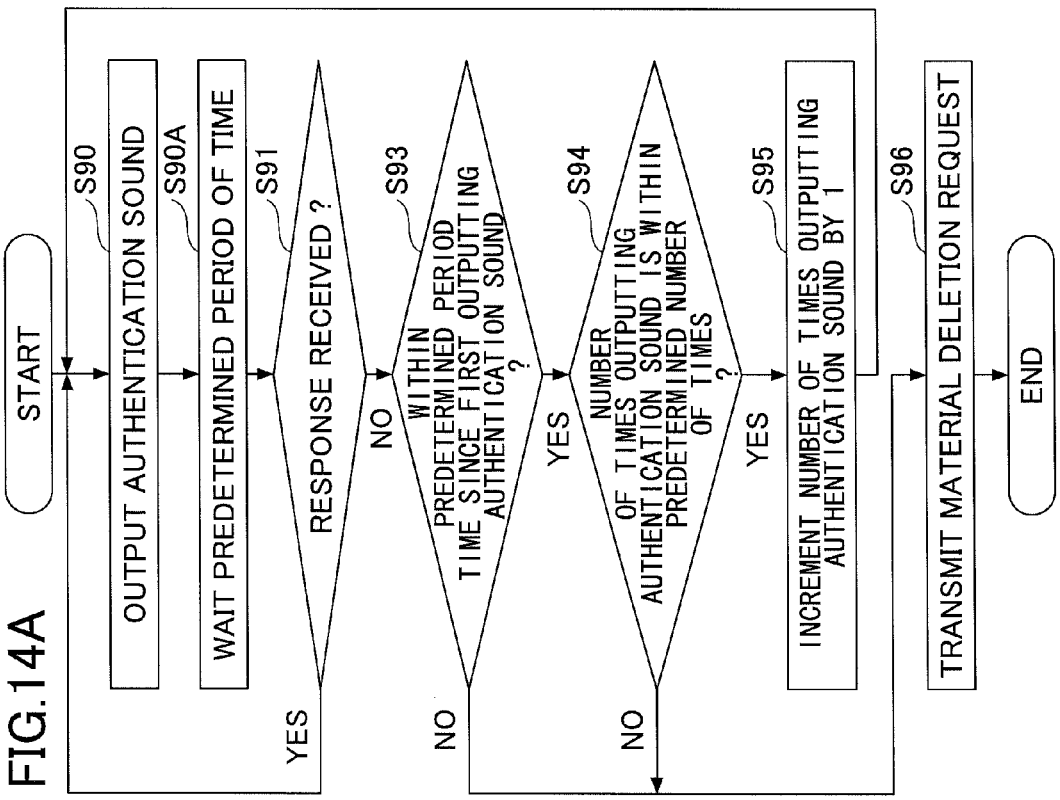

INFORMATION PROCESSING SYSTEM AND INFORMATION PROCESSING APPARATUS

BACKGROUND OF THE INVENTION

1. Field of the Invention

The present invention relates to an information processing system and an information processing apparatus.

2. Description of the Related Art

In the related art, a system is known in which, for example, for a meeting or a lesson, material that has been converted into an electronic form is distributed to mobile terminals (also called portable terminals) such as tablet terminals, smartphones or the like, so that the material can be thus read by respective participants, and the material converted into an electronic form is shared by the participants. Further, in such a system, a system is known for preventing the distributed material being leaked to persons other than the participants.

In order that only the participants can read the distributed material, it is necessary that the material is distributed only to the participants; the material is not transferred to a third person other than the participants, or is not readable by a third person even when it is distributed to the third person; and the material is deleted after the meeting.

Then, in the related art, a material distribution system is known (for example, see Patent reference NO. 1 (Japanese Laid-Open Patent Application No. 2009-175842)) in which a server is provided which stores portable terminal IDs of meeting participants, the server transmits meeting material accompanying the terminal IDs, and the material is stored in the portable terminals in a case where the terminal IDs accompanied by the material agree with the IDs of the portable terminals.

However, in the above-described method of Patent reference No. 1, a device or a server which stores the portable terminal IDs of the meeting participants and detects the participants' entering and leaving a meeting room is required. Further, in such a method, the meeting participants' leaving the meeting room is detected using the portable terminal IDs and the meeting material is deleted from the portable terminals. However, from the portable terminals, the meeting material may be transferred to the outside after it is received and stored. Thus, the information may be leaked by a transfer thereof to the outside.

SUMMARY OF THE INVENTION

According to one aspect, a first information processing apparatus is provided which outputs a sound having a predetermined frequency (frequencies). Further, a second information processing apparatus is provided which collects the sound that is output by the first information processing apparatus, and outputs a response to the sound having the predetermined frequency (frequencies) to the first information processing apparatus. The first information processing apparatus transmits predetermined data to the second information processing apparatus that has output the response to the sound of the predetermined frequency (frequencies).

Other objects, features and advantages of the present invention will become more apparent from the following detailed description when read in conjunction with the accompanying drawings.

BRIEF DESCRIPTION OF THE DRAWINGS

FIGS. 11A and 11B are flowcharts showing flows of password transmission and reception processes of the respective apparatuses;

FIG. 12 shows one example of a password setting screen page of the host apparatus;

FIG. 13 is a sequence diagram for deleting material that is distributed to the client apparatuses; and FIGS. 14A and 14B are flowcharts showing flows of distributed material deletion processes of the respective apparatuses.

DETAILED DESCRIPTION OF THE EMBODIMENT

The embodiment has been devised in consideration of the above-mentioned problem, and an object of the embodiment is to provide an information processing system and an information processing apparatus, by which material is allowed to be read within a predetermined space.

Below, the embodiment will be described in detail.

<Information Transmission System>

Figure 1:
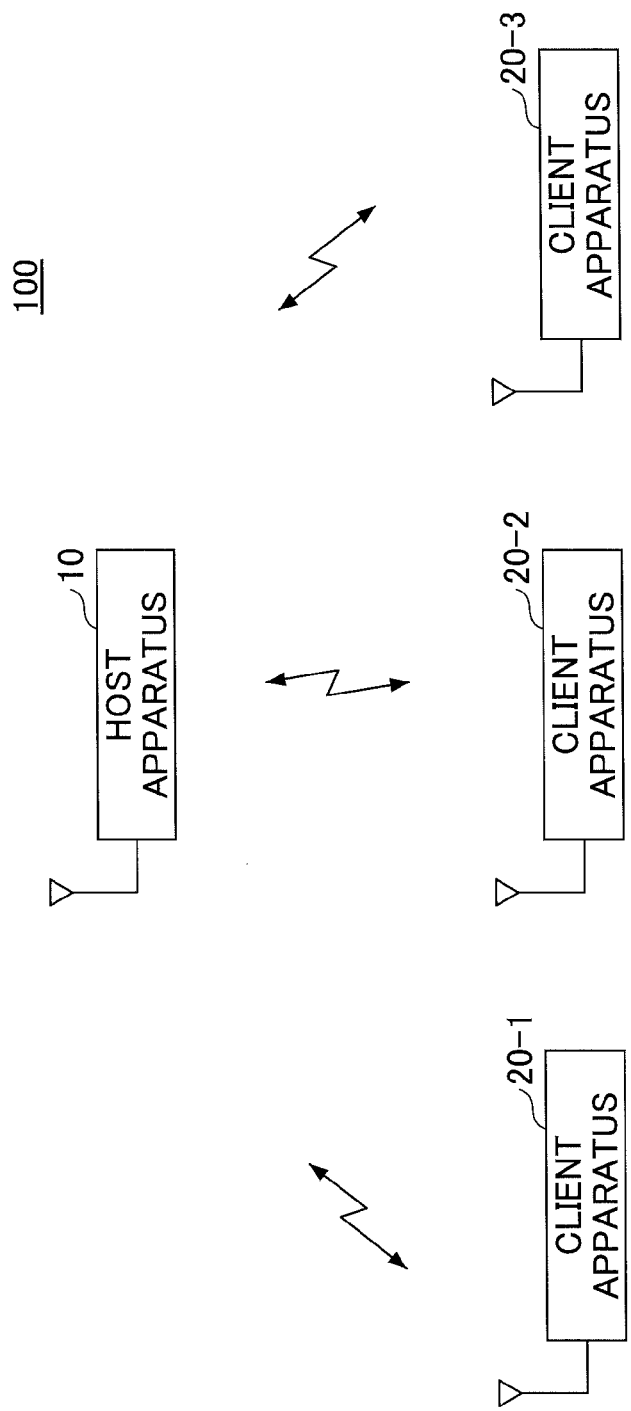
FIG. 1 shows the entirety of an information processing system serving as an information transmission system according to an embodiment.

FIG. 1 shows the entirety of an information processing system serving as an information transmission system according to an embodiment. As shown in FIG. 1, the information transmission system 10 includes a host apparatus (an information processing apparatus) 10 as an information transmission apparatus, and client apparatuses (information processing apparatuses) 20-1, 20-2 and 20-3 as information reception apparatuses. The host apparatus 10 and the client apparatuses 20-1, 20-2 and 20-3 are connected, for example, by a wireless network, and thus, can carry out transmission and reception of data wirelessly therebetween. Hereinafter, the client apparatuses 20-1, 20-2 and 20-3 may be generally referred to as client apparatuses 20.

It is noted that in the embodiment, as the wireless network, a wireless Local Area Network (LAN), a Bluetooth (registered trademark) network or the like may be used. However, the present invention is not limited to using it.

The host apparatus 10 is an apparatus that is used by a meeting organizer who organizes a meeting, for example. As the host apparatus 10, an information terminal (mobile terminal) or the like may be used, which is superior in portability, and for example, may be a tablet terminal, a smartphone, a portable telephone, a notebook type Personal Computer (PC)

or the like. However, the present invention is not limited to using it. For example, a projector, a server, a multifunction peripheral, or a dedicated device or the like which is permanently installed in a meeting room or the like, may be used as the host apparatus 10.

Further, the client apparatuses 20 are used by respective meeting participants who participate in a meeting. As the client apparatuses 20, information terminals (mobile terminals) or the like may be used, which are superior in portability, and for example, may be tablet terminals, smartphones, portable telephones, notebook type Personal Computers (PC) or the like. However, the present invention is not limited to using it.

When the host apparatus 10 is to transmit material (for example, predetermined data) to the client apparatuses 20 of participants who exist in a predetermined space of, for example, a meeting room or the like, the host apparatus 10 outputs an authentication sound, and transmits the material to client apparatuses 20 which have responded to the authentication sound. Further, in order to prevent the material from being transferred from the client apparatuses 20, the host apparatus 10 outputs a password for the material after converting the password into a sound. Without using the password, the material cannot be read. Also, the host apparatus 10 periodically outputs the authentication sound, and gives an instruction to delete the material to the client apparatus 20 from which no response to the authentication sound has been received.

Thus, in a case where the client apparatuses 20 continue to receive the authentication sound, the meeting participants can read the material. For example, when the client apparatus 20 becomes distant from the host apparatus 10, and thus is not able to receive the authentication sound, the received material is deleted from the client apparatus 20. Thus, it is possible to prevent the material from being leaked to a person other than the participants who exist in a predetermined space.

In a case where the host apparatus 10 is an apparatus permanently installed in a meeting room or the like (for example, a projector, a multifunction peripheral, a dedicated device or the like), a meeting organizer can distribute material to the client apparatuses 20 by uploading the material to the host apparatus 10 from an own terminal. Further, in a case where the host apparatus 10 is, for example, a multifunction peripheral or the like, electronic data obtained from paper material being read by a scanner may be used as the material other than the uploaded material.

According to the embodiment, distribution control is carried out on the material that is to be distributed from the above-described host apparatus 10, and the material can be read within a predetermined space.

<Functional Blocks of Host Apparatus 10>

Figure 2:
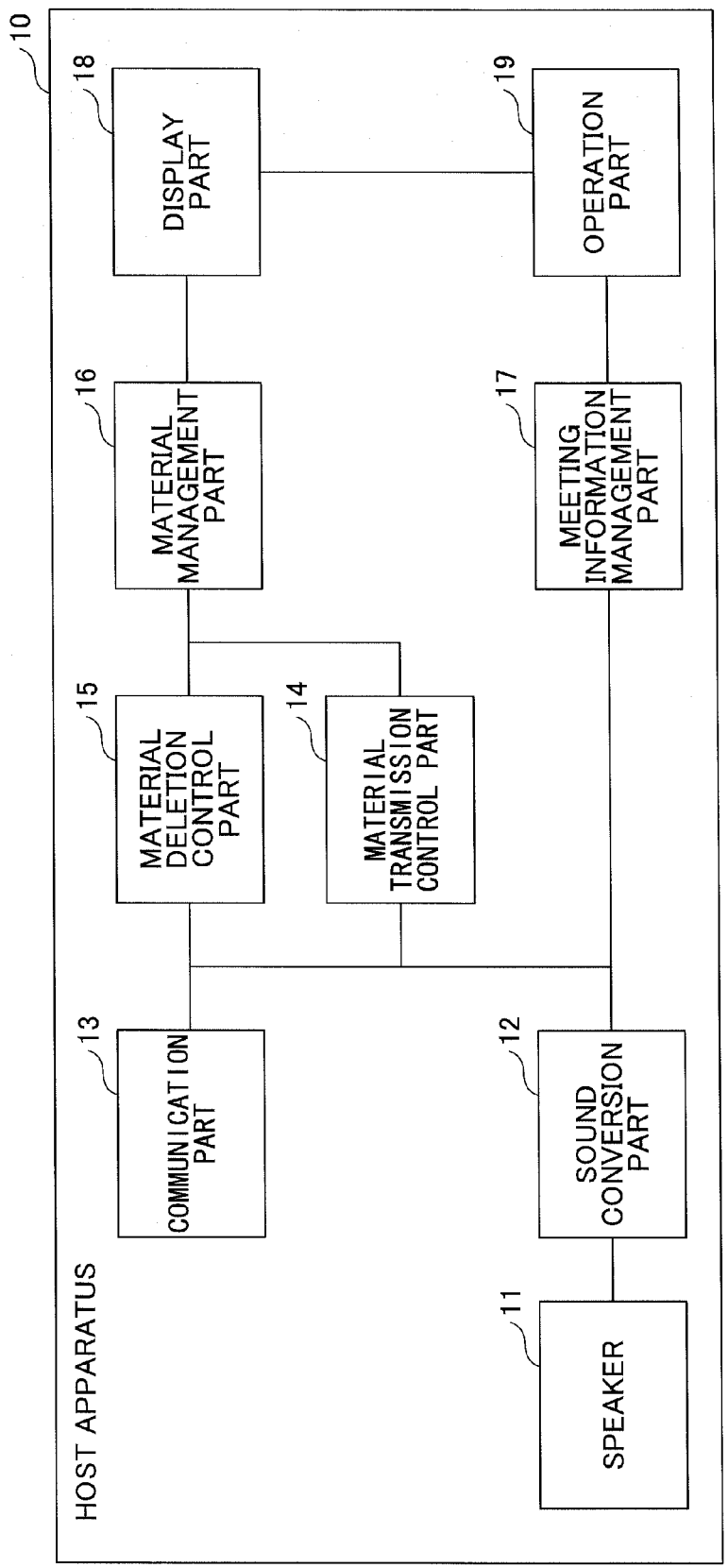
FIG. 2 shows one example of functional blocks of an information processing apparatus serving as an information transmission apparatus according to the embodiment.

Next, using FIG. 2, functional blocks of the above-described host apparatus 10 as the information transmission apparatus will be described. FIG. 2 shows one example of functional blocks of the information processing apparatus serving as the information transmission apparatus according to the embodiment.

As shown in FIG. 2, the host apparatus 10 includes a speaker 11 as a sound generation part, a sound conversion part 12, a communication part 13, a material transmission control part 14 as a data transmission control part, a material deletion part 15 as a data deletion control part, a material management part 16, a meeting information management part 17, a display part 18 and an operation part 19.

The speaker 11 outputs to the outside a sound of a predetermined frequency (frequencies) as the authentication sound and a predetermined sound that is obtained from conversion by the sound conversion part 12, once or plural times periodically. The authentication sound is a sound for authenticating the client apparatuses 20 to which material is to be transmitted. As the authentication sound, a sound of a frequency band(s) that is previously set is used. The authentication sound is generated by, for example, the sound conversion part 12 or the like. A standard method known in a facsimile technical field or the like may be used to generate the authentication sound. Specifically, for example, the respective numerals and/or the respective characters/letters are previously associated with different frequencies (or frequency bands), and a table that indicates the correspondence between the respective numerals and/or the respective characters/letters and frequencies (or frequency bands) is previously provided. The sound conversion part 12 stores the table and converts given information such as identification information (ID) or a password (each of which may be a string of numerals and/or characters/letters) into a series of sound units of the respective frequencies (or frequency bands) as the authentication sound according to the table. Also, a sound analysis part 22 (described later) of the client apparatus 20 stores the table and converts the series of sound units of the respective frequencies (or frequency bands) as the authentication sound into the original identification information (ID) or password (each of which may be the string of numerals and/or characters/letters) according to the table. However, the present invention is not limited to using it.

Other than generating the authentication sound, the sound conversion part 12 converts a password for material, identification information (ID) that is unique to the host apparatus 10, and so forth, into sounds of predetermined frequencies, respectively. It is noted that in a case where the above-mentioned password for material or ID that is unique to the host apparatus 10 is converted into a sound of a predetermined frequency (frequencies), a frequency (frequencies) that is (are) different from the predetermined frequency (frequencies) of the authentication sound may be used. Further, the sound conversion part 12 may detect an ambient noise that is collected by a microphone or the like, and adjust the volume of a sound of a predetermined frequency (frequencies) which is output by the speaker 11.

The communication part 13 carries out transmission/reception of data with the client apparatuses 20 and so forth, using a wireless communication network or the like, using a predetermined protocol, for example. Further, the communication part 13 receives responses to the authentication sound, which responses are output from the client apparatuses 20.

The material transmission control part 14 carries out control of transmission of material to the client apparatuses 20. Specifically, for example, when having obtained material requests from the client apparatuses 20 via the communication part 13, the material transmission control part 14 generates a control signal for generating the authentication sound for the client apparatuses 20, and outputs the generated control signal to the sound conversion part 12. It is noted that the material transmission control part 14 may obtain identification information (for example, MAC addresses, serial IDs, IP addresses or the like) of the client apparatuses 20, included in the material requests, output the obtained identification information to the meeting information management part 17, and cause it to store the identification information.

When generating the control signal for the sound conversion part 12 to create the authentication sound, the material transmission control part 14 may create the control signal for obtaining the authentication sound obtained from converting the ID that is unique to the host apparatus 10 into a sound of a predetermined frequency (frequencies). Thereby, the authentication sound differs for each host apparatus 10. Thus, it is possible to prevent, for example, the authentication sound from first being recorded and then output by a third person whereby the client apparatus 20 may be made to seem as if it exists near the host apparatus 10 although it is actually distant from the host apparatus 10.

The ID that is unique to the host apparatus 10 means, for example, a MAC address, a serial ID, an IP address, a name of the owner of the host apparatus 10, a password that is input to the host apparatus 10 or the like. The material transmission control part 14 may obtain the ID that is unique to the host apparatus 10 from, for example, a storage device that is provided internally, convert it into the authentication sound by the sound conversion part 12, and output it.

Further, after obtaining a response to the authentication sound from the client apparatus 20, the material transmission control part 14 obtains material that corresponds to the material request from the material management part 16, and carries out transmission control to output the obtained material to the client apparatus 20 from the communication part 13. In a case of including the ID that is unique to the host apparatus 10 in the authentication sound, the material transmission control part 14 may determine whether the ID included in the response obtained from the client apparatus 20 agrees with the ID that has been included in the authentication sound, and carry out control to transmit the material only in a case of the agreement.

Further, since there is a case where the client apparatus 20 cannot detect the authentication sound due to the surroundings such as ambient noise, the material transmission control part 14 may previously sample the ambient noise using a microphone and carry out control to create the authentication sound that has a volume that exceeds the noise.

Further, in a case of having received no response within a predetermined period of time after outputting the authentication sound, the material transmission control part 14 carries out control to again output the authentication sound from the sound conversion part 12. This is because it is not possible to determine whether no client apparatuses 20 exist or the client apparatuses 20 has not been able to detect the authentication sound. Specifically, the material transmission control part 14 determines whether responses have been received from the client apparatuses 20 within a predetermined period of time after outputting the authentication sound, the predetermined period of time being previously set, whether the number of times having output the authentication sound is within a predetermined number of times, and/or the like. At this time, the material transmission control part 14 may carry out control to output the authentication sound while increasing the volume thereof each time it outputs the authentication sound from the sound conversion part 12.

Further, the material transmission control part 14 may carry out control to determine that the client apparatuses 20 do not exist, and determine not to transmit material, in a case of having received no responses even after repetitively outputting the authentication sound a predetermined number of times or for a predetermined period of time.

The material deletion control part 15 carries out control to output from the speaker 11 the authentication sound generated by the sound conversion part 12 periodically (at predetermined intervals) to the client apparatuses 20 to which material has been transmitted, and determines whether to have received responses to the authentication sound within a predetermined period of time after outputting the authentication sound. In a case of having received no responses within the predetermined period of time, the material deletion control part 15 carries out control to transmit a deletion request for deleting the material that has been transmitted to the client apparatuses 20.

Further, the material deletion control part 15 may carry out control to output the authentication sound from the speaker 11 a predetermined number of times or for a predetermined period of time, for example, and carry out control to transmit the deletion request in a case of having received no responses to the authentication sound from the client apparatuses 20 to which material has been transmitted. At this time, the material deletion control part 15 may carry out control to output the authentication sound while increasing the volume thereof each time it outputs the authentication sound from the sound conversion part 12. Thus, the material deletion control part 15 controls the timing of generating the authentication sound, the number of times generating the authentication sound and/or the like to the client apparatuses 20 to which material has been transmitted.

The material management part 16 manages, for example, material, a password of the material, and/or the like, registered by a meeting organizer or the like from the operation part 19, for example.

The meeting information management part 17 manages information required for a meeting, such as the name of the meeting registered by a meeting organizer or the like from the operation part 19, terminal information (IP addresses and/or the like) of the client apparatuses 20 received from the communication part 13, and/or the like, for example.

The display part 18 displays a meeting creation screen page through which a meeting organizer or the like inputs data, and/or displays material and/or the like, for example.

The operation part 19 receives a setting of a meeting project and/or the like through the meeting creation screen page by a meeting organizer or the like, for example.

It is noted that since the client apparatuses 20 may output responses, as sounds, to the authentication sound, the host apparatus 10 may have a sound collection part such as a microphone for receiving the response sounds, a sound analysis part for analyzing the collected sounds, and the like. The sound collection part and the sound analysis part have functions approximately the same as or similar to those of the client apparatuses 20 described later. Since they will be described in the description for functional blocks of the client apparatuses 20, specific explanations are omitted here.

<Functional Blocks of Client Apparatuses 20>

Figure 3:
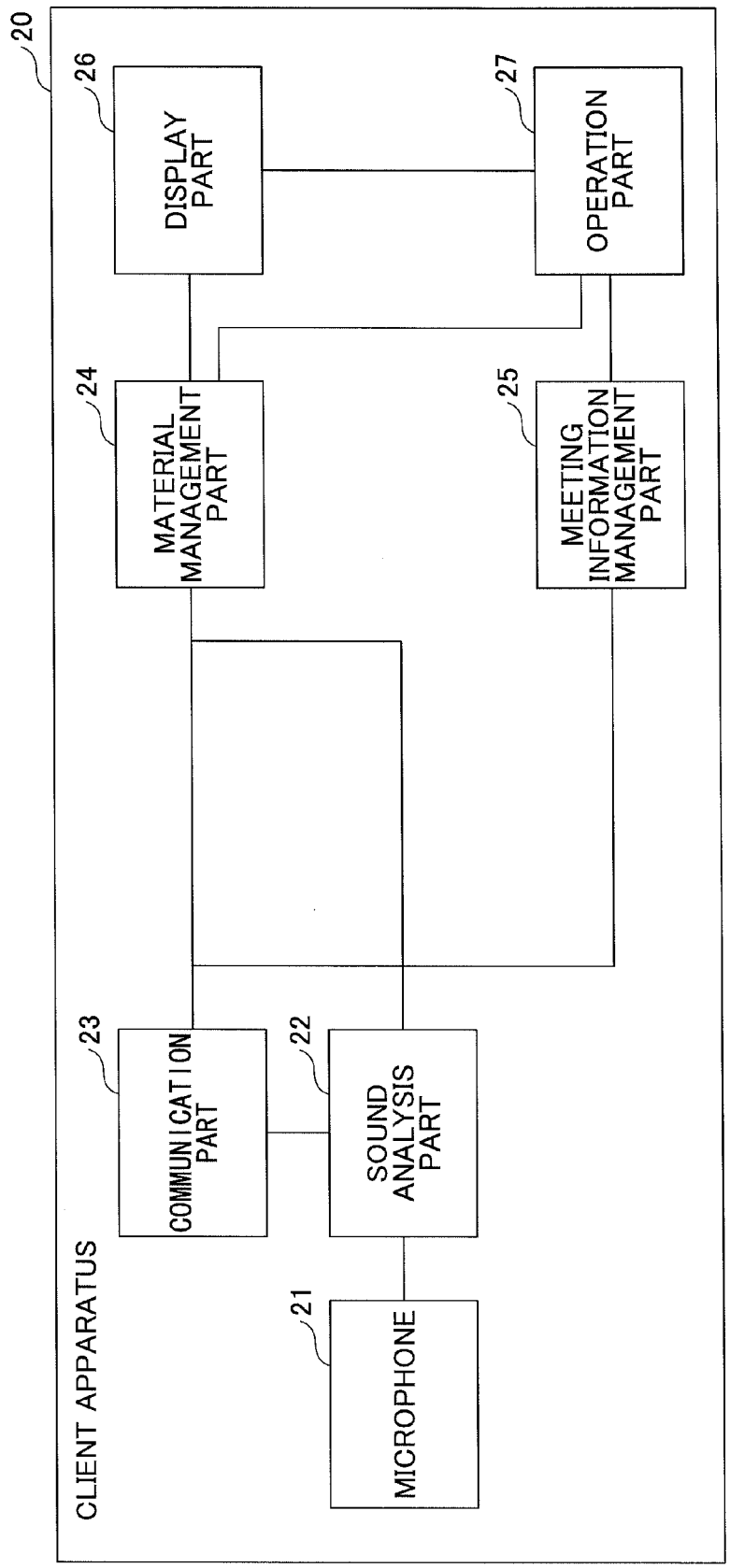
FIG. 3 shows one example of functional blocks of each of information processing apparatuses respectively serving as information reception apparatuses according to the embodiment.

Using FIG. 3, functional blocks of the client apparatuses (information processing apparatuses) 20, as the above-mentioned information reception apparatuses, will now be described. FIG. 3 shows one example of functional blocks of each of the client apparatuses 20 according to the embodiment.

As shown in FIG. 3, each of the client apparatuses 20 includes a microphone 21 as a sound collection part, the sound analysis part 22, a communication part 23, a material management part 24 as a data management part, a meeting information management part 25, a display part 26 and an operation part 27.

The microphone 21 collects the ambient sound and converts it into an electric signal.

The sound analysis part 22 analyses information included in the sound (electric signal) collected by the microphone 21. For example, the sound analysis part 22 determines whether the sound collected by the microphone 21 includes a sound of a predetermined frequency band(s). The sound analysis part 22 extracts a password of material, an ID that is unique to the host apparatus 10, and/or the like, from the sound (electric signal) collected by the microphone 21. In a case of having extracted as a result of the analysis a sound of a predetermined frequency band(s) as the authentication sound and/or an ID that is unique to the host apparatus 10, the sound analysis part 22 generates a response thereto, and outputs the response to the communication part 23.

Further, the sound analysis part 22 outputs a password of material or the like which has been obtained as the analysis result to the material management part 24. It is noted that the sound analysis part 22 may store the analysis result(s) in a storage device such as a memory that is provided internally.

The communication part 23 carries out transmission and/or reception of data with the host apparatus 10 or the like using a wireless communication network or the like using a predetermined protocol, for example. Specifically, the communication part 23 outputs a host search request, a material request and/or the like from the material management part 24 or the meeting information management part 25 to the host apparatus 10.

The communication part 23 outputs a name of a meeting of a meeting project, an IP address of the host apparatus 10, and/or the like, obtained from the host apparatus 10, to the meeting information management part 25. Further, the communication part 23 transmits, for example, the response obtained from the sound analyses part 22 to the host apparatus 10.

Further, the communication part 23 outputs material obtained from the host apparatus 10 to the material management part 24, or outputs to the material management part 24 the deletion request for deleting material obtained from the host apparatus 10.

The material management part 24 manages material obtained from the host apparatus 10, and, when receiving the deletion request for material from the host apparatus 10, deletes the material. Further, the material management part 24 makes a host search request for searching for the host apparatus 10 which has created a meeting project, and/or a material request for requesting material to be distributed from the host apparatus 10.

Specifically, the material management part 24 causes the display part 26 to output a meeting search screen page for obtaining material to be distributed for a meeting, or the like. At a time of starting up the client apparatus 20 or in response to an instruction given by a meeting participant from the operation part 27, the material management part 24 makes a host search request via the communication part 23, thus obtains meeting information from the host apparatus 10 as the host search result, generates the above-mentioned meeting search screen page and displays the generated meeting search screen page on the display part 26.

Further, the material management part 24 generates a material request for material to be distributed for a meeting, selected via the operation part 27 from the meeting search screen page or the like, displayed on the display part 26. The material management part 14 transmits the generated material request to the host apparatus 10 via the communication part 23. Further, the material management part 24 displays material obtained from the host apparatus 10 via the communication part 23 on the display part 26, and/or stores it in a storage device such as a memory provided internally. Further, the material management part 24 may obtain a password and/or an ID from an analysis of the sound analysis part 22, store it in an internal memory or the like, and manage it.

The meeting information management part 25 manages information that is required for a meeting such as a name of the meeting, an IP address of the host apparatus 10, and/or the like, obtained from the communication part 23.

The display part 26 displays, for example, material, various sorts of screen pages and/or the contents obtained from the operation part 27 being operated.

The operation part 27 receives an input from a user such as a meeting organizer. It is noted that the display part 26 and the operation part 27 may be integrally configured such as a touch panel, for example.

It is noted that the client apparatus 20 may output a response to the authentication sound as a sound. In this case, the client apparatus 20 may have as a sound generation part a speaker or the like of outputting the response sound, and a sound conversion part. It is noted that the sound generation part and the sound conversion part have functions approximately the same as or similar to those of the host apparatus 10, and thus specific explanations therefor are omitted here.

The host apparatus 10 and the client apparatus 20 may be an integrated apparatus (information transmission and reception apparatus) that includes the functions of both the apparatuses 10 and 20. That is, for example, a mobile terminal may have the configurations of the host apparatus 10 and the client apparatus 20, and thus, may be used as the host apparatus 10 at a time, and may also be used as the client apparatus 20 at another time.

Below, a configuration of the above-mentioned integrated apparatus will be described. It is noted that in the explanation below, the mobile terminal is used as an example. However, the present invention is not limited to using such a mobile terminal.

<Function Blocks of Mobile Terminal>

Figure 4:
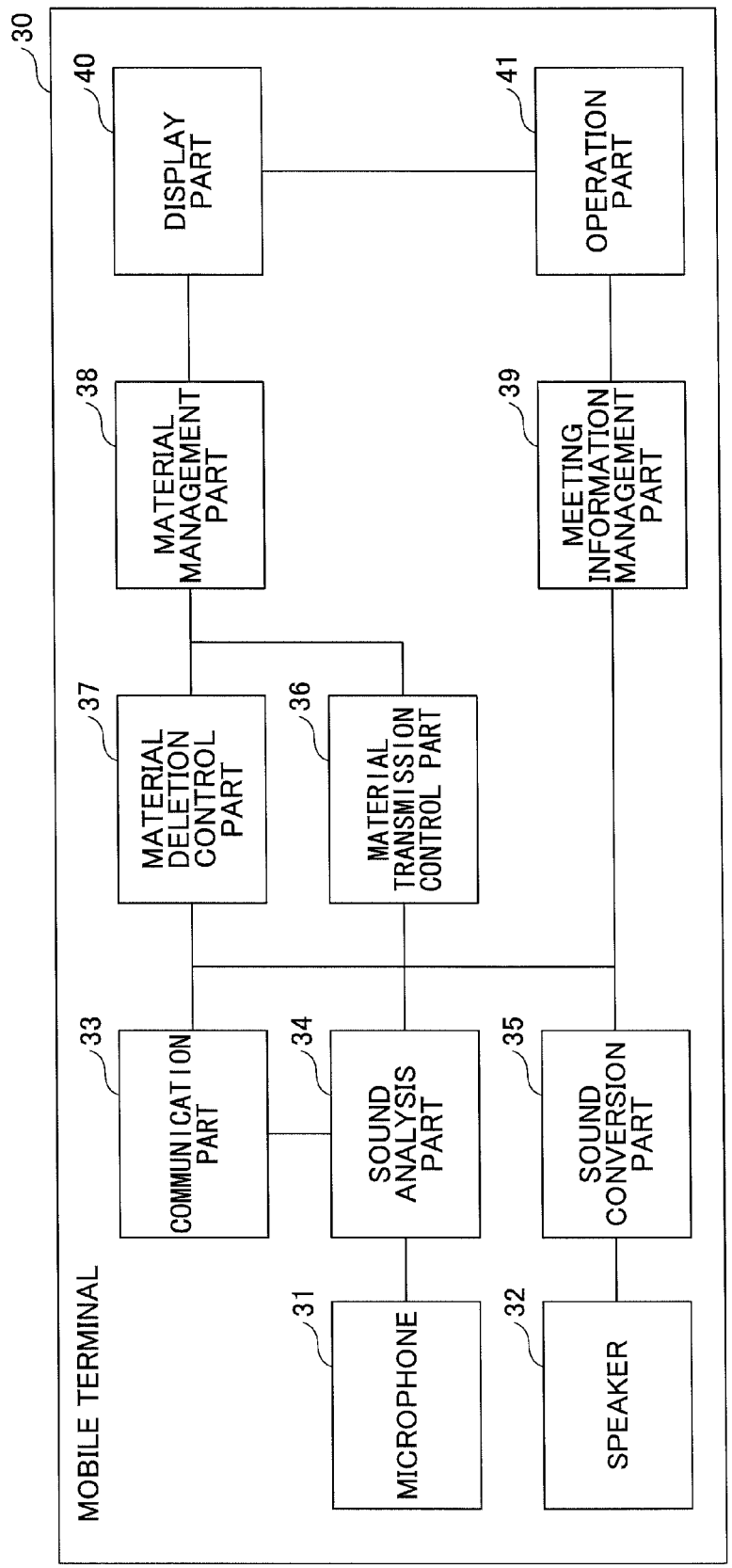
FIG. 4 shows one example of functional blocks of a mobile terminal according to the embodiment.

FIG. 4 shows one example of functional blocks of a mobile terminal according to the embodiment. It is noted that the mobile terminal 30 can act as the host apparatus 10 of a meeting organizer and also act as the client apparatus 20 of a meeting participant, as mentioned above. Thus, in the example of FIG. 4, modules required for both the host apparatus 10 and the client apparatus 20 are shown and will be described.

As shown in FIG. 4, the mobile terminal 30 includes a microphone 31, a speaker 32, a communication part 33, a sound analysis part 34, a sound conversion part 35, a material deletion control part 36, a material transmission control part 37, a material management part 38, a meting information management part 39, a display part 40 and an operation part 41.

As mentioned above, the mobile terminal 30 has functions approximately the same as or similar to those of the host apparatus 10 or the client apparatus 20. Thus, the microphone 31 corresponds to the microphone 21, the speaker 32 corresponds to the speaker 11, the communication part 33 corresponds to the communication parts 13 and 23, the sound analysis part 34 corresponds to the sound analysis part 22, and the sound conversion part 35 corresponds to the sound conversion part 12.

Further, the material deletion control part 36 corresponds to the material deletion control part 15, the material transmission control part 37 corresponds to the material transmission control part 14, the material management part 38 corresponds to the material management parts 16 and 24, the meeting information management part 39 corresponds to the meeting information management parts 17 and 25, the display part 40 corresponds to the display parts 18 and 26, and the operation part 41 corresponds to the operation parts 19 and 27.

<Hardware Configurations>

Figure 5:
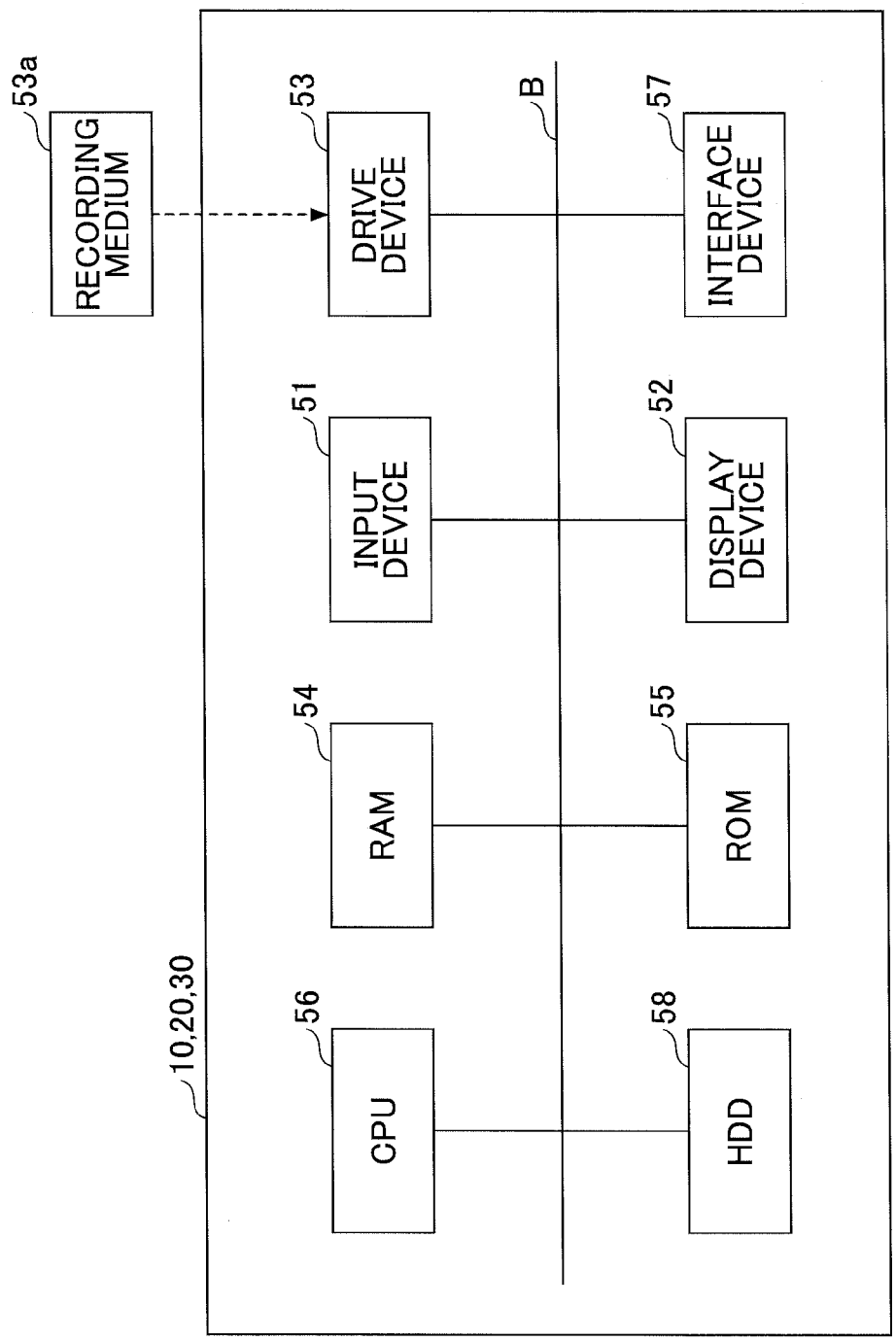
FIG. 5 shows one example of a hardware configuration of each of the information processing apparatuses serving as the information transmission apparatus and the information reception apparatuses according to the embodiment.

Next, using FIG. 5, hardware configurations of the above-mentioned information transmission apparatus (information processing apparatus) and information reception apparatus (information processing apparatus) will be described. FIG. 5 shows one example of a hardware configuration of each of the information transmission apparatus and the information reception apparatus.

As shown in FIG. 5, each of the host apparatus 10, the client apparatus 20 and the mobile apparatus 30 (hereinafter, simply referred to as the apparatuses 10, 20 and 30) as the information transmission apparatus and the information reception apparatus according to the embodiment includes an input device 51, a display device 52, a drive device 53, a Random Access Memory (RAM) 54, a Read Only Memory (ROM) 55, a Central Processing Unit (CPU) 56, an interface device 57 and a Hard Disk Drive (HDD) 58. These devices are mutually connected by a bus B.

The input devices 51 include touch panels or the like, and are used to input respective operation signals to the apparatuses 10, 20 and 30. The display devices 52 display processing results of the apparatuses 10, 20 and 30.

The interface devices 57 are interfaces connecting the apparatuses 10, 20 and 30 to a transmission path such as a wireless network or the like. Thus, the apparatuses 10, 20 and 30 can carry out data communication with other external apparatuses via the interface devices 57.

The HDDs 58 are non-volatile storage devices that store programs and/or data. The programs and/or the data stored in the HDDs 58 may include systems (for example, Operating Systems (OSs) as basic software such as "Windows (registered trademark)", "UNIX (registered trademark)", or the like) that control the entireties of the apparatuses 10, 20 and 30, applications that provide various functions on the systems, and/or the like. Further, the programs and/or the data stored in the HDDs 58 are managed by predetermined file systems and/or Data Bases (DBs).

The drive devices 53 are interfaces for detachable recording media 53a. Thereby, the apparatuses 10, 20 and 30 can read and/or write from/to the recording media 53a via the drive devices 53, respectively. As the recording media 53a, for example, SD memory cards, Universal Serial Bus (USB) memories or the like, may be used.

The ROMs 55 are non-volatile semiconductor memories (storage devices) that can hold internal data even after power supplies are cut off. In the ROMs 55, Basic Input/Output Systems (BIOS) that are executed when the apparatuses 10, 20 and 30 are started up, programs, and/or data such as system settings, network settings and/or the like, are stored. The RAMs 56 are volatile semiconductor memories (storage devices) that temporarily store programs and/or data. The CPUs 56 are processors that perform controls of the entireties of the apparatuses 10, 20 and 30 and/or loaded functions, by reading programs and/or data from the above-mentioned storage devices (for example, the HDDs 58, the ROMs 55 or the like) into the RAMs 54, and carrying out processes.

Thus, the apparatuses 10, 20 and 30 can perform various processes using the above-mentioned hardware configurations.

<Material Transmission and Reception Sequence of Host Apparatus and Client Apparatus>

Figure 6:
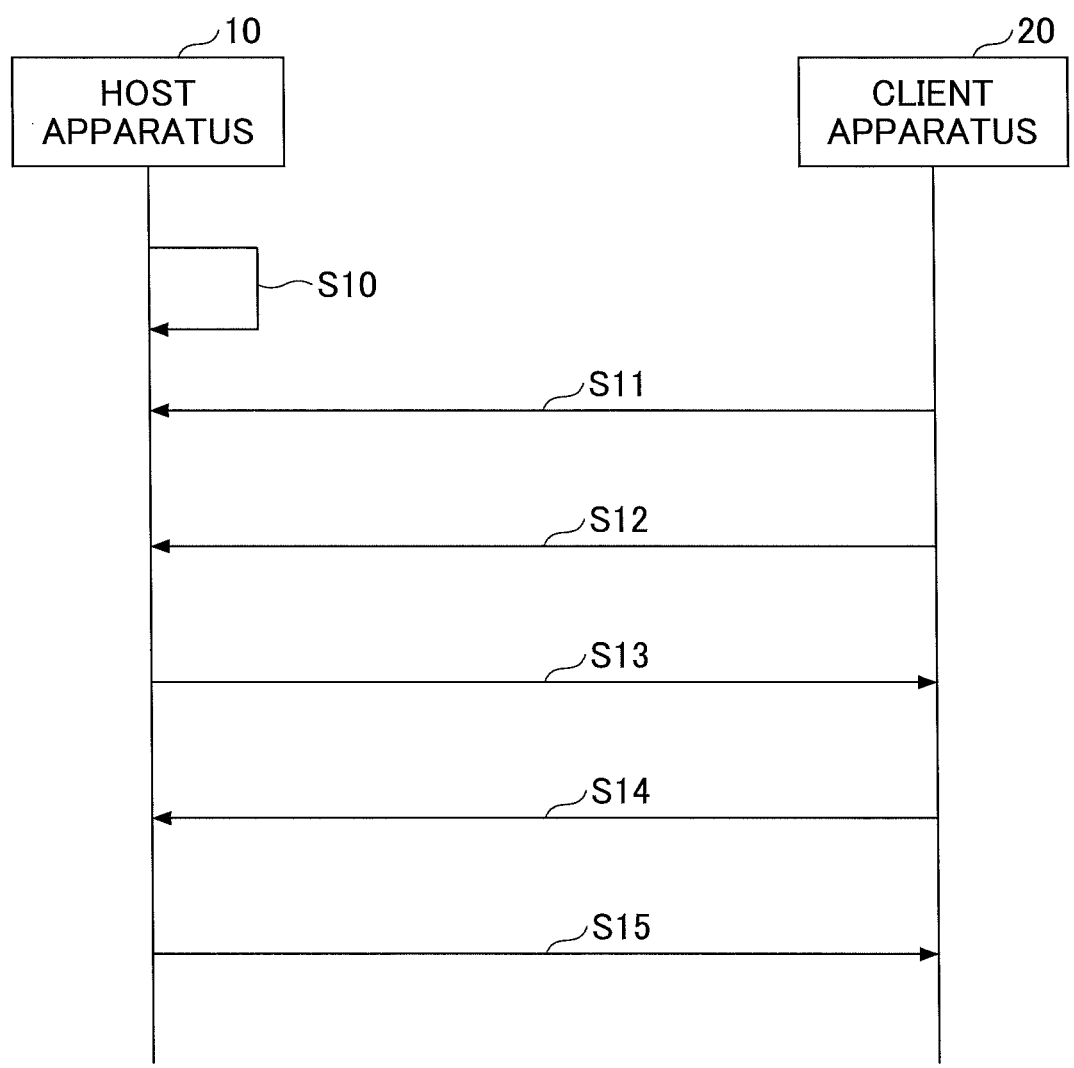
FIG. 6 is a material transmission and reception sequence diagram of a host apparatus and a client apparatus.

Next, using FIG. 6, a material transmission and reception sequence of the host apparatus 10 and the client apparatus 20 will be described. FIG. 6 is a material transmission and reception sequence of the host apparatus 10 and the client apparatus 20. It is noted that in an example of FIG. 6, a case will be assumed where a meeting organizer has the host apparatus 10, the meeting participants have the client apparatuses 20, respectively, and the meeting is held in a closed meeting room.

As shown in FIG. 6, the host apparatus 10 creates meeting projects (step S10) from the meeting organizer's inputs to the meeting creation screen page or the like displayed on the display part 18 with the operation part 19. Thus, the meeting organizer can set meeting names that the meeting organizer will host, material to be distributed for the meetings, and the like, for example. It is noted that the material to be distributed may be, for example, stored in the host apparatus 10 of the meeting organizer or the like, or may be stored in an external apparatus provided on the Web which is previously set.

When the system is started up, the client apparatus 20 displays a meeting search screen page or the like on the display part 26, for example. Then, when a predetermined button (for example, a "meeting search" button, see FIG. 9C described later) that exists on the meeting search screen page is pressed, the material management part 24 of the client apparatus 20 searches for the host apparatus 10 which has created the meeting projects, using the communication part 23 (step S11). It is noted that the above-mentioned meeting search (host search) may be automatically carried out simultaneously with the starting up of the system.

The material management part 24 may carry out the search via the communication part 23 by using, for example, a predetermined network protocol such as Bonjour, Simple Network Management Protocol (SNMP) or the like, or a short-range wireless communication protocol such as Bluetooth or the like.

The meeting information management part 25 stores connection information such as an IP address or the like of the host apparatus 10 that has been retrieved in step S11. Also the host apparatus 10 stores connection information such as an IP address of the client apparatus 20 in the meeting information management part 17 similarly. Thus, the host apparatus 10 and the client apparatus 20 can be connected by a wireless network or the like.

Figure 9A:
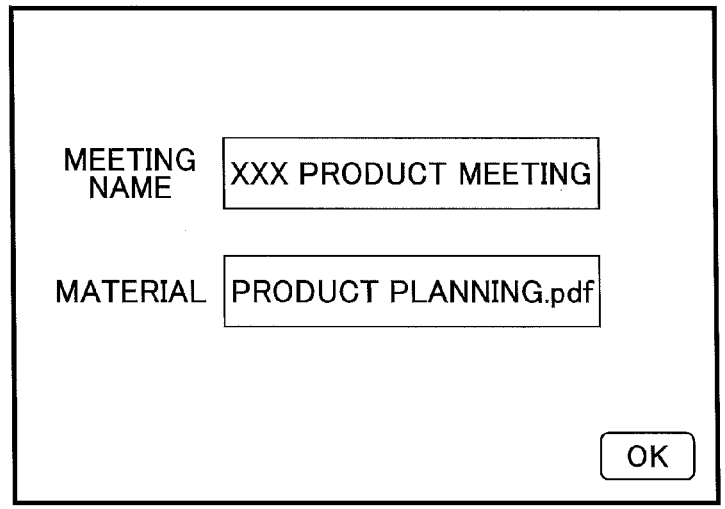
FIGS. 9A, 9B and 9C show examples of screen pages that are displayed on the host apparatus and the client apparatus.
Figure 9B:
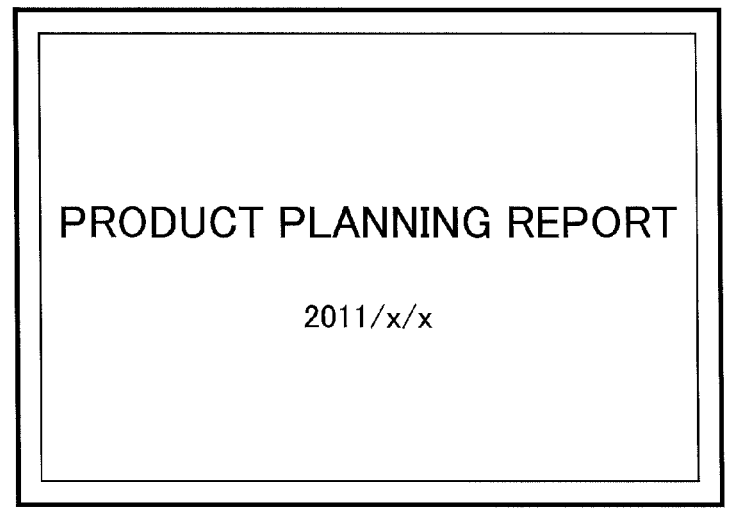
Figure 9C:
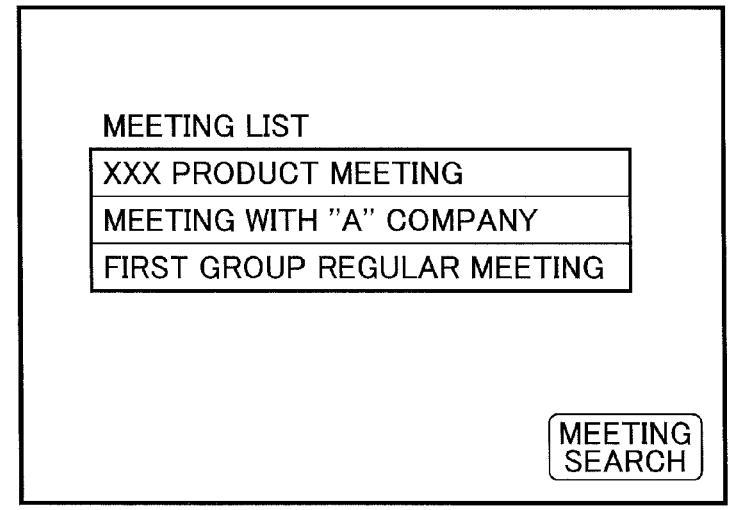

Further, the client apparatus 20 obtains the meeting names of the meeting projects that have been created by the host apparatus 10 by using the communication part 23, and displays the meeting names in a form of a meeting list on the meeting search screen page of the display part 26 (see FIG. 9C).

Then, when, for example, a desired meeting name is tapped (selected) on the meeting screen page of the display part 26, the material management part 24 outputs a material request corresponding to the selected meeting name to the host apparatus 10 which has created the material of the selected meeting name, via the communication part 23 (step S12). It is noted that the material request from the client apparatus 20 may be output as a material request signal using, for example, a wireless communication network or the like. Alternatively, a sound corresponding to the material request may be generated, and may be output from the client apparatus 20 to the host apparatus 10.

After thus making the material request, the client apparatus 20 continuously collects sounds with the microphone 21, and analyses the collected sounds for a sound of a default frequency band(s) or the like (i.e., the authentication sound) that is previously set, for example, by the sound analysis part 22.

When having received the material request, the material transmission control part 14 of the host apparatus 10 causes the sound conversion part 12 to generate a sound of the default frequency band(s) as the authentication sound, for example, and outputs the generated sound from the speaker 11 (step S13).

The sound analysis part 22 of the client apparatus 20 analyses the collected sounds for the sound of the default frequency band(s), and in a case where the peak exists in the frequency band(s), the client apparatus 20 outputs a response to the host apparatus 10 from the communication part 23 (step S14).

The response from the client apparatus 20 may be output as an authentication sound response signal via a wireless communication network or the like from the communication part 23, for example. A sound corresponding to the authentication sound may be generated, and the sound may be output to the host apparatus 10 as the response from a sound generation part such as a speaker.

When having received the response from the client apparatus 20 via the communication part 13, the material transmission control part 14 of the host apparatus 10 determines that the material is allowed to be transmitted, obtains the material from the material management part 16, and transmits the material to the client apparatus 20 from the communication part 13 (step S15). It is preferable that the material is transmitted via a wireless network or the like in consideration of data communications traffic and/or rate, and stability, for example.

When having received the material by the communication part 23, the client apparatus 20 stores the material in the material management part 24, and can display the material on the display part 26.

The reason why the host apparatus 10 does not transmit material to the client apparatus 20 unless having received a response to the authentication sound from the client apparatus 20 as described above is that an apparatus outside of the meeting room may be detected by the network search using SNMP, Bluetooth or the like. According to the embodiment, by transmitting material only to the client apparatus 20 which has responded to the authentication sound that has been output by the host apparatus 10, it is possible to transmit the material by the host apparatus 10 only to an apparatus which exists within an area (for example, in the meeting room or the like) to which the authentication sound reaches.

<Material Transmission and Reception Process of Host Apparatus and Client Apparatus>

Figure 7:
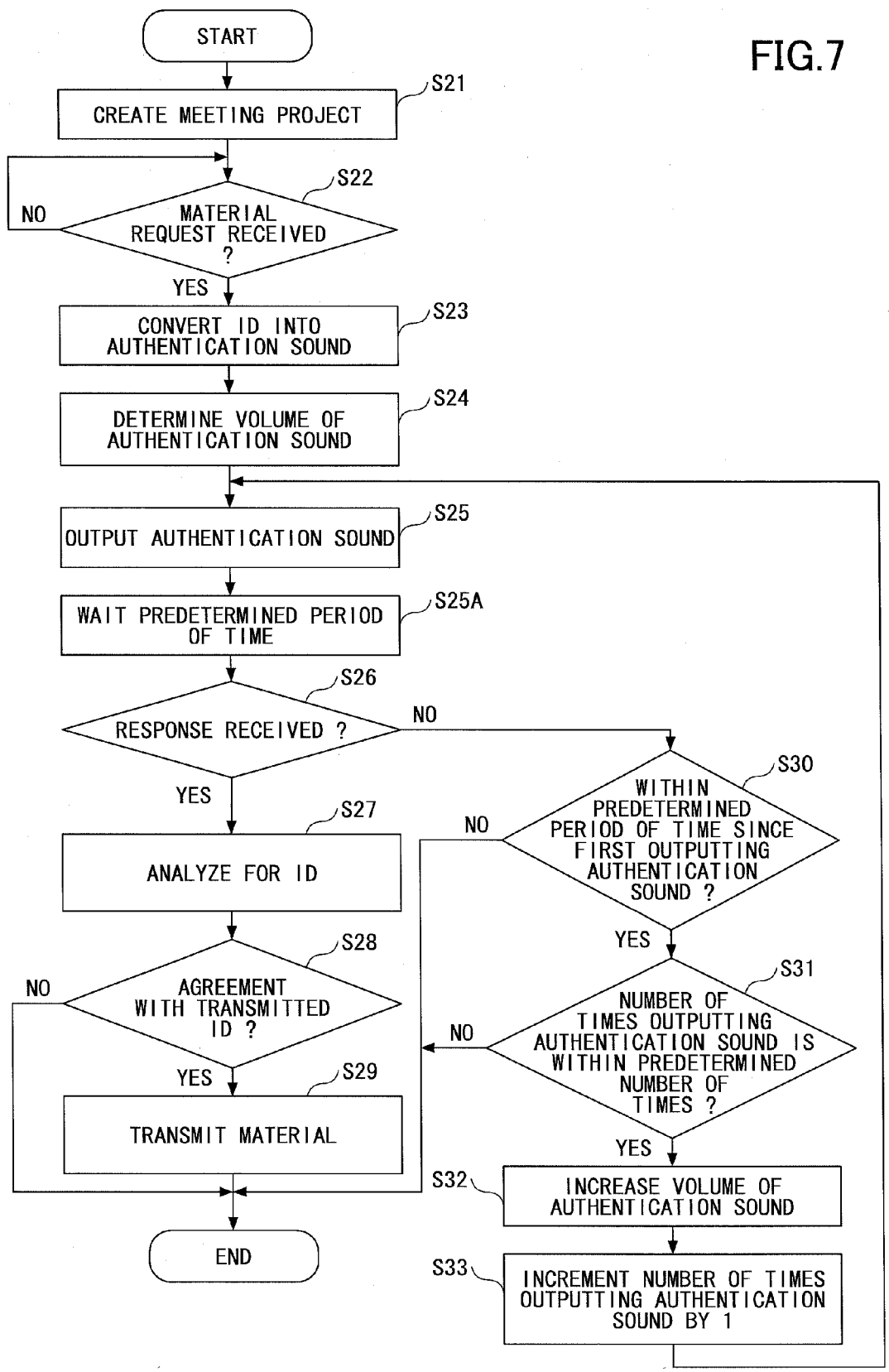
FIG. 7 is a flowchart showing a flow of a material transmission process of the host apparatus.
Figure 8:
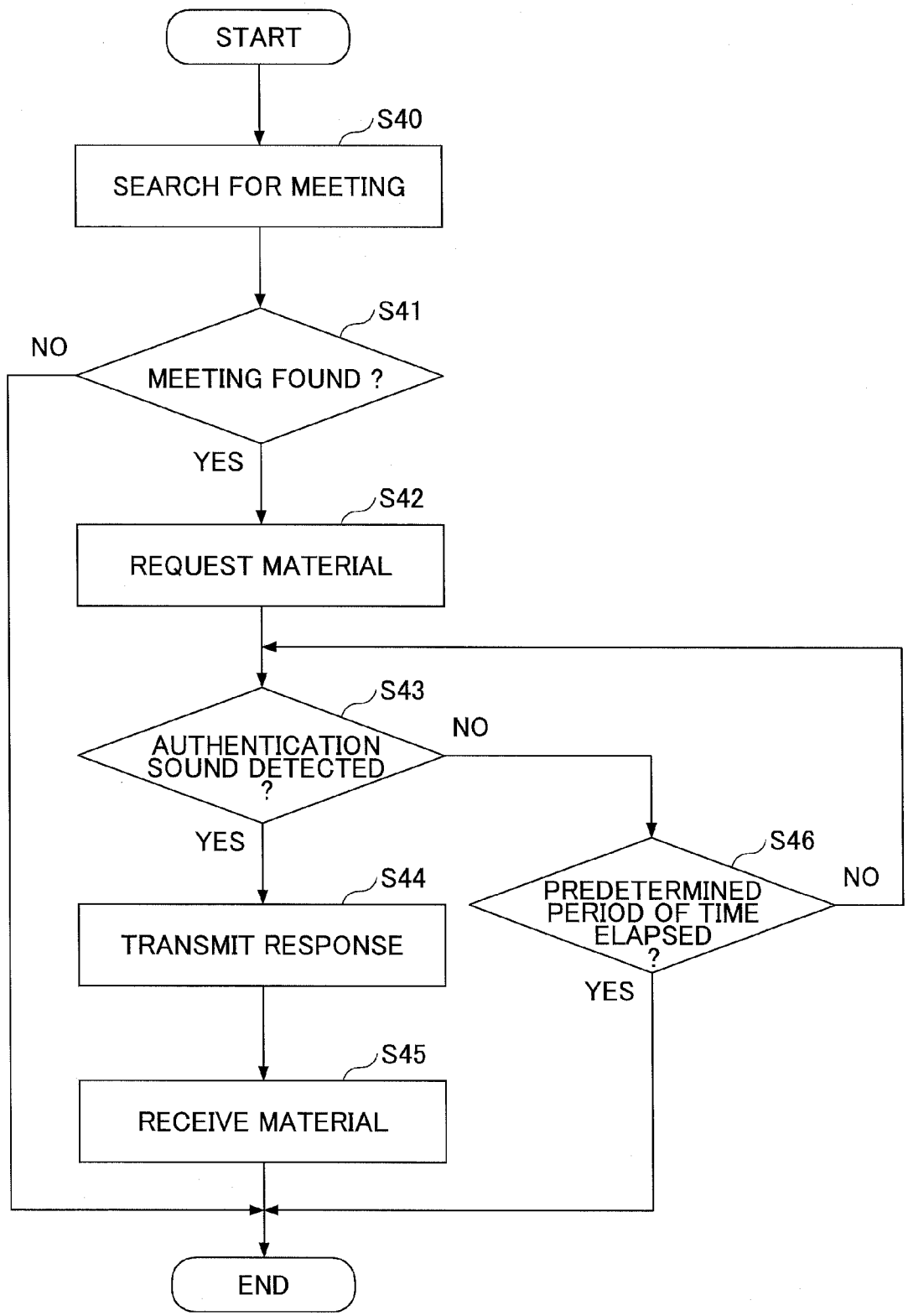
FIG. 8 is a flowchart showing a flow of a material reception process of the client apparatus.

Next, using FIGS. 7 through 9C, a material transmission and reception process of the host apparatus 10 and the client apparatus 20 described above will be described. FIG. 7 is a flowchart showing a flow of a material transmission process of the host apparatus 10. FIG. 8 is a flowchart showing a flow of a material reception process of the client apparatus 20. FIGS. 9A, 9B and 9C show examples of screen pages that are displayed on the host apparatus 10 and the client apparatus 20.

It is noted that in an example of FIG. 7, a method of creating the authentication sound is different from the method of generating the authentication sound of step S13 of FIG. 6 described above.

Specifically, as shown in FIG. 7, after creating meeting projects (step S21), the material transmission control part 14 of the host apparatus 10 determines whether a material request has been made by the client apparatus 20 (step S22). When having determined that no material request has been made by the client apparatus 20 (step S22 NO), the material transmission control part 14 continues step S22.

On the other hand, when having determined that a material request has been made by the client apparatus 20 (step S22 YES), the sound conversion part 12 converts a predetermined ID into the authentication sound (step S23). The predetermined ID is an ID that is unique to the host apparatus 10 or the like, as mentioned above.

Next, the volume of the authentication sound to be generated by the sound conversion part 12 is determined in step S24. As described above, there is a case where the client apparatus 20 cannot obtain the authentication sound that is output by the host apparatus 10 by using the microphone 21 due to a problem of the surroundings such as the ambient noise or the like, as mentioned above. Thus, the host apparatus 10, for example, samples the external noises by using a microphone or the like, and the material transmission control part 14 carries out control to cause the sound conversion part 12 to create the authentication sound of the volume that exceeds the magnitude of the collected noises.

Further, the volume of the authentication sound may be set according to the size of the meeting room or the like which is previously set. That is, in a case where the host apparatus 10 is permanently installed in the meeting room or the like, a fixed volume may be set as the volume of the authentication sound. Thus, volumes of the authentication sound may be previously set for respective meeting rooms, and the authentication sound of the predetermined volume may be output as a result of the meeting organizer or the like selecting the meeting room.

Next, the host apparatus 10 outputs the authentication sound of the volume that has been determined in step S24 from the speaker 11 (step S25), and waits a predetermined period of time (S25A).

Next, the material transmission control part 14 determines whether a response has been received from the client apparatus 20 (step S26). In a case of having determined that the response has been received (step S26 YES), the material transmission control part 14 analyses the ID included in the response (step S27).

The material transmission control part 14 of the host apparatus 10 determines whether the ID obtained from the analysis of step S27 agrees with the ID that has been included in the authentication sound and has been transmitted in step S23 (step S28). In a case of having determined that the ID obtained from the analysis agrees with the transmitted ID (step S28 YES), the material transmission control part 14 transmits the material to the client apparatus 20 (step S29). In a case of having determined that the ID obtained from the analysis does not agree with the transmitted ID (step S28 NO), the material transmission control part 14 finishes the process.

In a case of having determined that a response from the client apparatus 20 has not been received (step S26 NO), the material transmission control part 14 determines whether the period of time during which no response has been received from the client apparatus 20 is within a predetermined period of time after outputting the authentication sound (step S30).

In a case of having determined that the period of time during which no response has been received from the client apparatus 20 is within the predetermined period after the authentication sound has been output in step S25 the first time (step S30 YES), the material transmission control part 14 determines whether the number of times outputting the authentication sound is within a predetermined number of times (step S31). In a case of having determined that the number of times outputting the authentication sound is within the predetermined number of times (step S31 YES), the material transmission control part 14 increases the volume of the authentication sound (step S32), increments the count of the number of times outputting the authentication sound by 1 (step S33), and returns to step S25.

In a case of having determined that the period of time during which no response has been received from the client apparatus 20 is not within the predetermined period (step S30 NO), the material transmission control part 14 finishes the process. Further, in a case of having determined that the number of times outputting the authentication sound is not within the predetermined number of times (step S31 NO), the host apparatus 10 finishes the process.

As described above, in a case where no response has been received within a predetermined period of time after outputting the authentication sound, the host apparatus 10 cannot determine whether the client apparatus 20 does not exist within a predetermined area or the client apparatus 20 has not been able to detect the authentication sound due to an influence of a noise or the like.

Thus, the host apparatus 10 increases the volume of the authentication sound to be output by the sound conversion part 12 and again outputs the authentication sound. The material transmission control part 14 carries out control to repeat this process for a predetermined period of time or a predetermined number of times. In a case where still no response has been received from the client apparatus 20 even after the predetermined period of time has elapsed (step S30 NO) or the predetermined number of times has been exceeded (step S31 NO), the material transmission control part 14 determines that no client apparatus 20 exists, and carries out control not to transmit the material.

Next, a flow of a material reception process of the client apparatus 20 will be described. As shown in FIG. 8, the material management part 24 of the client apparatus 20 carries out a meeting search (step S40), and determines whether there is a meeting (step S41). As mentioned above, the client apparatus 20 searches for the host apparatus 10 that has created a meeting project.

In a case of having determined that there is a predetermined meeting (step S41 YES), the material management part 24 of the client apparatus 20 makes a material request (step S42). It is noted that the client apparatus 20 finishes the process in a case of having determined that there is no predetermined meeting (step S41 NO).

Next, the sound analysis part 22 of the client apparatus 20 determines whether the authentication sound that is output by the host apparatus 10 has been detected (step S43). In a case of having determined that the authentication sound has been detected (step S43 YES), the client apparatus 20 transmits a response to the authentication sound to the host apparatus 10 (step S44). At this time, in a case where the sound analysis part 22 has detected the authentication sound from the host apparatus 10 and has determined that an ID is included in the authentication sound, the client apparatus 20 includes the ID in the response and transmits the response to the host apparatus 10.

In a case where the material transmission control part 14 of the host apparatus 10 has determined that the ID included in the authentication sound agrees with the ID of the response, the host apparatus 10 transmits material, and the client apparatus 20 receives the material (step S45).

On the other hand, in a case of having determined that the authentication sound is not detected (step S43 NO), the client apparatus 20 determines whether a predetermined period of time has elapsed since, for example, step S42 has been carried out (step S46). In a case of having determined that the predetermined period of time has not elapsed yet (step S46 NO), the process returns to step S43. In a case of having determined that the predetermined period of time has elapsed (step S46 YES), an operation of trying to hear the authentication sound with the microphone 21 is stopped, and the process is finished.

As mentioned above, the client apparatus 20 can carry out retrying even after failing in detection of the authentication sound that is output from the host apparatus 10, and thus, it is possible to improve the detection accuracy.

FIG. 9A shows one example of the meeting creation screen page that is displayed on the host apparatus 10. FIG. 9B shows one example of a material display screen page that is displayed on the host apparatus 10. FIG. 9C shows one example of the meeting search screen page that is displayed on the client apparatus 20.

As shown in FIG. 9A, on the display part 18 of the host apparatus 10, the meeting creation screen page is displayed. A meeting organizer (material distributor) inputs a meeting name "XXX product meeting", material "product planning.pdf" and so forth to the meeting creation screen page using the operation part 19 or the like, and sets the material to distribute for the meeting.

When the "OK" button shown in FIG. 9A has been pressed after the material to distribute is set, the meeting material (in the example of FIGS. 9A, 9B and 9C, "product planning report (2011/x/x)") shown as the material display screen page in FIG. 9B is displayed on the display part 18 of the host apparatus 10.

Further, each of the meeting participants searches for the host apparatus 10 which has thus currently created the meeting using the meeting search screen page shown in FIG. 9C, for example. For example, when the meeting participant presses the "meeting search" button on the meeting search screen page of FIG. 9C, a meeting list is displayed, as shown in FIG. 9C. In the example of FIG. 9C, the host apparatus 10 which has created meetings, i.e., "XXX product meeting", "meeting with A company", "first group regular meeting" and so forth is displayed as a meeting list.

It is noted that, for example, there may be a case where material that has been transmitted to the client apparatus 20 is transferred to the outside of the meeting room from the client apparatus 20, and thus, the information is leaked. Usually, a method is employed in which material is accompanied by a password, and then, the material is distributed with the password. However, the password of the material is orally known to a person to whom the material is distributed, or distributed to the person in writing form. Thus, there is a possibility of the password being leaked.

Thus, according to the embodiment, a password of material is converted into a sound. Then, a configuration is provided by which even when the material is transferred to the outside through transmission and reception of the sound, the material cannot be opened by a person unless the person exists in the same meeting room. Below, a specific example of the configuration will be described.

<Password Transmission and Reception Process of Host Apparatus and Client Apparatus>

Figure 10:
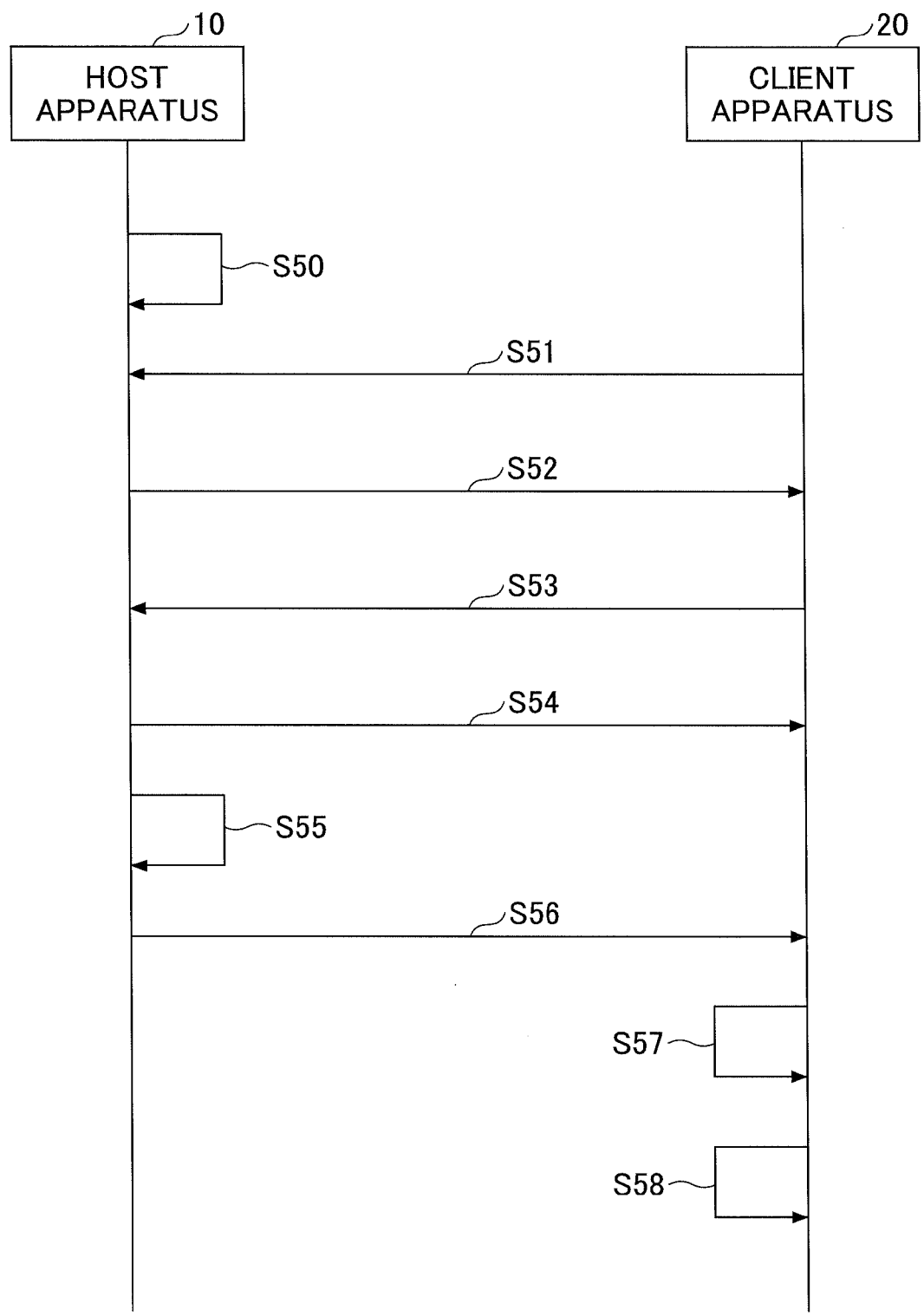
FIG. 10 is a sequence diagram of transmitting a password from the host apparatus to the client apparatus.

FIG. 10 is a sequence diagram for transmitting a password to the client apparatus 20 from the host apparatus 10. FIGS. 11A and 11B are flowcharts showing a flow of password transmission and reception processes of the respective apparatuses. FIG. 12 shows one example of a password setting screen page of the host apparatus 10. In comparison to the sequence of FIG. 6, processes of steps S51 through S54 of the sequence of FIG. 10 are the same as or similar to the processes of steps S12 through S15, and thus, duplicate description therefor will be omitted. The different processes of steps S50 and S55 through S58 in the sequence of FIG. 10 will now be described.

In the process of step S50, when the host apparatus 10 creates a meeting project, a password is previously set for material by a known method (for example, a method of accompanying a PDF document with a password, or the like). For example, a password is set in the meeting creation screen page displayed on the display part 18. The password that is thus set is a character string or a collection of numerical values which is set for the material.

Further, when the host apparatus 10 has transmitted the material to the client apparatus 20 in the process of step S54, the material transmission control part 14 obtains the password of the material from the material management part 16, the sound conversion part 12 converts the password into a predetermined sound (step S55), and the host apparatus 10 outputs the password of the material in the form of the predetermined sound to the client apparatus 20 (step S56).

The client apparatus 20 obtains the sound that is thus output by the host apparatus 10 in step S56, the sound analysis part 22 analyses the sound (step S57), and obtains the password. The client apparatus 20 uses the obtained password to open the material received in step S54 and thus causes the material to enter a state in which the material can be read (step S58). It is noted that in order to prevent the password obtained from the analysis from being known to a third person, it is preferable that the password is not displayed on the display part 26.

Thus, according to the embodiment, even when material is transferred to a third person, the third person does not have a method of determining the password of the material. Thus, it is possible to avoid information leakage.

Next, a password transmission and reception process of each apparatus will be described. FIG. 11A is a flowchart showing a flow of a password transmission process of the host apparatus 10. FIG. 11B is a flowchart showing a flow of a password reception process of the client apparatus 20.

As shown in FIG. 11A, the host apparatus 10 determines whether a password has been input, for example, on the meeting creation screen page (step S60). In a case of having determined that a password has been input (step S60 YES), the sound conversion part 12 converts the input password into a sound (step S61). Next, the host apparatus 10 outputs the password sound obtained from the conversion of step S61 to the client apparatus 20 (step S62), and finishes the process. It is noted that in a case of having determined that no password has been input (step S60 NO), the process is finished.

Next, as shown in FIG. 11B, the client apparatus 20 determines whether the sound analysis part 22 has detected the password sound that is thus output by the host apparatus 10 (step S70). In a case of having determined that the password sound has been detected (step S70 YES), the client apparatus 20 analyses the detected password sound, and inputs the password thus obtained from the analysis to the material (step S71) to display the material (step S72).

On the other hand, in a case of having determined that the password sound has not been detected (step S70 NO), the client apparatus 20 determines whether a predetermined period of time has elapsed since, for example, receiving the material (step S73). In a case of having determined that the predetermined period of time has not elapsed (step S73 NO), the process of the client apparatus 20 returns to step S70. In a case of having determined that the predetermined period of time has elapsed (step S73 YES), the process of the client apparatus 20 is finished.

The password setting screen page for setting a password on the host apparatus 10 will now be described. As shown in FIG. 12, an area for setting a password of material is provided in the password setting screen page, in addition to areas for inputting a meeting name and material, for example. For example, by inputting a password (in the example of FIG. 12, "1234") in the area for inputting a password, a meeting organizer sets the password for the material to be transmitted to the client apparatus 20.

It is noted that although material can be read only by the client apparatus 20 which exists in a meeting room, the material may be read by a third person in a case where the client apparatus 20 that has received the material is removed from the meeting room. Thus, according to the embodiment, control is carried out such that material stored in the client apparatus 20 that has been removed from the meeting room will be automatically deleted. Below, a specific example thereof will be described.

<Distributed Material Deletion Process of Host Apparatus and Client Apparatus>

FIG. 13 is a sequence diagram for deleting material that has been distributed to the client apparatus 20. FIGS. 14A and 14B are flowcharts showing flows of distributed material deletion processes of the respective apparatuses. In comparison to the sequence of FIG. 6, a process of step S80 of the sequence of FIG. 13 is the same as or similar to the process of step S10, and processes of steps S81 through S84 of the sequence of FIG. 13 are the same as or similar to the processes of steps S12 through S15, and thus, duplicate description therefor will be omitted. The different processes in the sequence of FIG. 13 will now be described.

As shown in FIG. 13, after transmitting material to the client apparatus 20 in step S84, the host apparatus 10 carries out control to output the authentication sound at predetermined intervals (periodically) to the client apparatus 20 from the speaker 11 (step S85). The authentication sound may be, for example, the same as or different from the authentication sound used for transmitting the material (described above using FIGS. 6, 7, 8 and so forth), for example. The volume of the authentication sound may be different from the authentication sound used for transmitting the material. In the process of step S85, instead of automatically outputting the authentication sound at predetermined intervals, the authentication sound may be output in response to a trigger (for example, pressing a button, or the like) given by the host apparatus 10. Below, the case where the authentication sound is output at predetermined intervals will be described.

The client apparatus 20 continues to carry out analysis for the authentication sound that is output by the host apparatus 10 by the sound analysis part 22. Then, when it has been determined that a sound of a predetermined frequency band(s) is included the analyzed sound, the client apparatus 20 outputs a response to the host apparatus 10 (step S86). When having received the response from the client apparatus 20, the host apparatus 10 determines that the client apparatus 20 exists in the same meeting room.

Further, the host apparatus 10 continues to output the authentication sound at predetermined intervals (or in response to certain triggers) (step S87). Then, in a case of having determined that no response has been received from the client apparatus 20 within a predetermined period of time since outputting the authentication sound, the material deletion control part 15 transmits a material deletion request to the client apparatus 20 (step S88). The material deletion request of the material deletion control part 15 may be preferably made by using a wireless network, for example, such that the material deletion request will surely reach the client apparatus 20 even when the client apparatus 20 is distant from the host apparatus 10.

Next, when having received the material deletion request, the client apparatus 20 outputs a deletion instruction to the material management part 24, and the material management part 24 deletes the material that has been received from the host apparatus 10 (step S89).

According to the embodiment, it is possible to delete material that has been stored in the client apparatus 20, after the client apparatus 20 that has received the material is removed from a meeting room.

Next, material deletion processes of the respective apparatuses will be described. As shown in FIG. 14A, the host apparatus 10 outputs the authentication sound to the client apparatus 20 by the material deletion control part 15 (step S90), waits a predetermined period of time (step S90A), and determines whether a response has been received from the client apparatus 20 within the predetermined period of time (step S91). In a case of having determined that a response has been received from the client apparatus 20 within the predetermined period of time (step S91 YES), the host apparatus 10 returns to step S90.

In a case of having determined that no response has been received from the client apparatus 20 within the predetermined period of time (step S91 NO), the material deletion control part 15 determines whether the period of time that has elapsed since outputting the authentication sound in step S90 the first time is within a predetermined period of time (step S93). In a case of having determined that it is within the predetermined period of time (step S93 YES), the host apparatus 10 determines whether the number of times having output the authentication sound in step S90 is within a predetermined number of times (step S94). In a case of having determined that the number of times having output the authentication sound is within the predetermined number of times (step S94 YES), the host apparatus 10 increments the count of the number of times having output the authentication sound by 1 (step S95), and the process returns to step S90.

In a case of having determined that the period of time that has elapsed since first outputting the authentication sound is not within the predetermined period of time (step S93 NO), or having determined that the number of times having output the authentication sound is not within the predetermined number of times (step S94 NO), the material deletion control part 15 transmits the material deletion request (step S96), and finishes the process.

Further, as shown in FIG. 14B, the client apparatus 20 determines whether the sound analysis part 22 has detected (obtained) the authentication sound that is output in step S90 by the host apparatus 10 (step S100). In a case of having determined that the authentication sound has been detected (step S100 YES), the client apparatus 20 transmits a response to the host apparatus 10 (step S101).

In a case of having determined that the authentication sound that is output by the host apparatus 10 has not been detected (step S100 NO), the client apparatus 20 determines whether the material deletion request has been received (step S102). In a case of having determined that the material deletion request from the host apparatus 10 has not been received (step S102 NO), the client apparatus 20 returns to step S100.

In a case of having determined that the material deletion request from the host apparatus 10 has been received (step S102 YES), the material management part 24 deletes the material (step S103), and finishes the process.

As described above, according to the embodiment, reading of material within a predetermined space is allowed. That is, only in a case of existing within a predetermined space, it is possible to read necessary material. The predetermined space may mean, for example, the space of a classroom, a movie theater, a theme park or the like in addition to a meeting room mentioned above. However, according to the present invention, the predetermined space is not limited thereto.

The information processing system (serving as the information transmission system) and the information processing apparatuses (serving as the information transmission apparatus and the information reception apparatus, respectively) have been described above by the embodiment. However, the present invention is not limited to the specifically disclosed embodiment, and variations and modifications may be made without departing from the scope of the present invention.

The present application is based on Japanese Priority Application No. 2011-202196, filed Sep. 15, 2011, the entire contents of which are hereby incorporated herein by reference.

What is claimed is:

1. An information processing system comprising:
a first information processing apparatus that is configured to output a sound of a predetermined frequency; and
a second information processing apparatus that is configured to collect the sound that is output from the first information processing apparatus, and output a response to the sound of the predetermined frequency to the first information processing apparatus, wherein
the first information processing apparatus is configured to transmit predetermined data to the second information processing apparatus that has output the response to the sound of the predetermined frequency, the predetermined data including password protection,
the first information processing apparatus is configured to convert a password of the predetermined data into a predetermined sound, the password being a password for unlocking the password protection included in the predetermined data and output the predetermined sound,
the second information processing apparatus is configured to analyze the predetermined sound that is output by the first information processing apparatus, and obtain the password, and
the first information processing apparatus includes a deletion control part that is configured such that, based on no response to the sound of the predetermined frequency being received from the second information processing apparatus to which the predetermined data has been transmitted within a predetermined period of time since outputting the sound of the predetermined frequency, the deletion control part,
outputs the sound of the predetermined frequency by the sound generation part periodically after the data transmission control part transmits the predetermined data, and
transmits a deletion request for deleting the predetermined data, and
the second information processing apparatus has a data management part configured to manage data in such a manner that the data management part deletes the predetermined data based on having received the deletion request from the deletion control part of the first information processing apparatus.

2. The information processing system as claimed in claim 1, wherein
the first information processing apparatus has a sound generation part is configured to output the sound of the predetermined frequency, and
the second information processing apparatus includes,
a sound collection part configured to collect sound that is output by the sound generation part, and
a sound analysis part that is configured to carry out analysis for information included in sound that is collected by the sound collection part.

3. The information processing system as claimed in claim 2, wherein
the first information processing apparatus includes a data transmission control part configured to carry out control to transmit the predetermined data to the second information processing apparatus that has output the response to the sound of the predetermined frequency, and the data transmission control part is configured to cause the sound conversion part to convert identification information for identifying the first information processing apparatus into an identification sound, and configured to cause the sound generation part to output the identification sound, instead of the sound of the predetermined frequency.

4. The information processing system as claimed in claim 1, wherein
the deletion control part is configured such that, based on no response to the sound of the predetermined frequency being received within the predetermined period of time, the deletion control part controls the sound generation part to output the sound of the predetermined frequency a predetermined number of times or for a predetermined period of time.

5. The information processing system as claimed in claim 2, wherein
the sound conversion part is configured to output the sound of the predetermined frequency by the sound generation part in such a manner that a volume of the sound of the predetermined frequency is increased each time the sound generation part outputs the sound of the predetermined frequency.

6. The information processing system as claimed in claim 2, wherein
the sound conversion part is configured such that, based on an ambient noise being detected, the sound conversion part outputs the sound of the predetermined frequency in such a manner that a volume of the sound of the predetermined frequency is adjusted according to a magnitude of the detected ambient noise.

7. The information processing system as claimed in claim 4, wherein
the deletion control part is configured to output the deletion request based on no response to the sound of the predetermined frequency being received from the second information processing apparatus to which the predetermined data has been transmitted, after the sound of the predetermined frequency has been output the predetermined number of times or for the predetermined period of time.

8. An information processing apparatus, the information processing apparatus comprising:
a sound generation part configured to output a sound of a predetermined frequency, the information processing apparatus being a first information processing apparatus;
a data transmission control part configured to, after the sound generation part outputs the sound of the predetermined frequency, carry out control to transmit predetermined data to a second information processing apparatus, based on receiving, from the second information processing apparatus, a response to the sound of the predetermined frequency, the predetermined data including password protection;
a sound conversion part configured to convert a password of the predetermined data into a predetermined sound such that the second information processing apparatus is capable of obtaining the password through analysis of the predetermined sound, the password being a password for using the predetermined data,
the first information processing apparatus being configured to output, by the sound generation part, the predetermined sound; and
a deletion control part that is configured such that, based on no response to the sound of the predetermined frequency being received from the second information processing apparatus to which the predetermined data has been transmitted within a predetermined period of time since outputting the sound of the predetermined frequency, the deletion control part,
outputs the sound of the predetermined frequency by the sound generation part periodically after the data transmission control part transmits the predetermined data, and
transmits a deletion request for deleting the predetermined data, wherein
the deletion control part is configured such that the transmitted deletion request causes the second information processing apparatus to delete the predetermined data.

9. The first information processing apparatus as claimed in claim 8, wherein
the data transmission control part is configured to cause the sound conversion part to convert identification information for identifying the first information processing apparatus into an identification sound and cause the sound generation part to output the identification sound, instead of the sound of the predetermined frequency.

10. The first information processing apparatus as claimed in claim 8, wherein
the deletion control part is configured such that, based on no response to the sound of the predetermined frequency being received within the predetermined period of time, the deletion control part controls the sound generation part to output the sound of the predetermined frequency a predetermined number of times or for a predetermined period of time.

11. The first information processing apparatus as claimed in claim 8, wherein
the sound conversion part is configured to output the sound of the predetermined frequency by the sound generation part in such a manner that a volume of the sound of the predetermined frequency is increased each time the sound generation part outputs the sound of the predetermined frequency.

12. The first information processing apparatus as claimed in claim 8, wherein
the sound conversion part is configured such that, when an ambient noise has been detected, the sound conversion part outputs the sound of the predetermined frequency in such a manner that a volume of the sound of the predetermined frequency are adjusted according to a magnitude of the detected noise.

13. The first information processing apparatus as claimed in claim 10, wherein
the deletion control part is configured to output the deletion request based on no response to the sound of the predetermined frequency being received from the second information processing apparatus to which the predetermined data has been transmitted, after the sound of the predetermined frequency has been output the predetermined number of times or for the predetermined period of time.

14. An information processing apparatus, the information processing apparatus comprising:
a sound collection part configured to collect an ambient sound, the information processing apparatus being a first information processing apparatus;
a sound analysis part configured to analyze the sound collected by the sound collection part, and configured to extract a sound of a predetermined frequency that is output by a second information processing apparatus;

an output part that is configured to output a response to the sound of the predetermined frequency extracted by the sound analysis part; and
a data management part that is configured to manage predetermined data that is received at the first information processing apparatus from the second information processing apparatus after the output part outputs the response, the received predetermined data including password protection,
wherein the sound analysis part is configured to,
    analyze a predetermined sound that is received at the first information processing apparatus from the second information processing apparatus, and
    obtain, based on the analysis, a password for unlocking the password protection included in the predetermined data,
wherein the data management part is configured to manage data in such a manner that the data management part deletes the predetermined data based on having received a deletion request from the second information processing apparatus, and
wherein the first information processing apparatus is configured to receive, from the second information processing apparatus, the sound of the predetermined frequency periodically after receiving the predetermined data, and to receive the deletion request based on no response to the sound of the predetermined frequency being transmitted from the first information processing apparatus to the second information processing apparatus within a predetermined period of time.

* * * * *